United States Patent
Okamura et al.

(10) Patent No.: US 8,993,132 B2
(45) Date of Patent: Mar. 31, 2015

(54) CUBIC BORON NITRIDE SINTERED BODY TOOL

(75) Inventors: Katsumi Okamura, Itami (JP); Machiko Abe, Itami (JP); Satoru Kukino, Itami (JP)

(73) Assignee: Sumitomo Electric Hardmetal Corp., Itami-shi (JP)

( * ) Notice: Subject to any disclaimer, the term of this patent is extended or adjusted under 35 U.S.C. 154(b) by 0 days.

(21) Appl. No.: 13/503,327

(22) PCT Filed: Jul. 25, 2011

(86) PCT No.: PCT/JP2011/066814
§ 371 (c)(1),
(2), (4) Date: Apr. 20, 2012

(87) PCT Pub. No.: WO2012/029440
PCT Pub. Date: Mar. 8, 2012

(65) Prior Publication Data
US 2012/0208006 A1 Aug. 16, 2012

(30) Foreign Application Priority Data
Sep. 1, 2010 (JP) ................................ 2010-195462

(51) Int. Cl.
| | | |
|---|---|---|
| B32B 9/00 | (2006.01) | |
| B32B 9/04 | (2006.01) | |
| B24D 3/00 | (2006.01) | |
| B22F 1/00 | (2006.01) | |
| C04B 35/00 | (2006.01) | |
| C22C 32/00 | (2006.01) | |
| B23B 27/14 | (2006.01) | |
| C04B 35/488 | (2006.01) | |
| C04B 35/5831 | (2006.01) | |
| C04B 35/626 | (2006.01) | |
| C04B 35/628 | (2006.01) | |
| C04B 35/63 | (2006.01) | |
| C04B 35/645 | (2006.01) | |
| B82Y 30/00 | (2011.01) | |

(52) U.S. Cl.
CPC ............ B23B 27/148 (2013.01); C04B 35/488 (2013.01); C04B 35/5831 (2013.01); C04B 35/6261 (2013.01); C04B 35/62842 (2013.01); C04B 35/62884 (2013.01); C04B 35/62897 (2013.01); C04B 35/6303 (2013.01); C04B 35/645 (2013.01); B82Y 30/00 (2013.01); B23B 2224/04 (2013.01); B23B 2226/125 (2013.01); C04B 2235/3217 (2013.01); C04B 2235/3232 (2013.01); C04B 2235/3244 (2013.01); C04B 2235/3813 (2013.01); C04B 2235/3839 (2013.01); C04B 2235/3843 (2013.01); C04B 2235/3886 (2013.01); C04B 2235/5445 (2013.01); C04B 2235/5454 (2013.01); C04B 2235/80 (2013.01); C04B 2235/386 (2013.01); C04B 2235/96 (2013.01)
USPC ............. 428/704; 428/688; 428/332; 419/13; 419/33; 501/96.1; 501/96.4; 51/307; 51/309

(58) Field of Classification Search
None
See application file for complete search history.

(56) References Cited

U.S. PATENT DOCUMENTS

| | | | | |
|---|---|---|---|---|
| 5,690,706 | A | * | 11/1997 | Sigalas et al. .................... 51/307 |
| 6,316,094 | B1 | | 11/2001 | Fukaya et al. |
| 2004/0002418 | A1 | | 1/2004 | Scurlock et al. |
| 2007/0099030 | A1 | | 5/2007 | Dahl |
| 2008/0016785 | A1 | | 1/2008 | Kukino et al. |
| 2008/0264203 | A1 | | 10/2008 | Dahl et al. |
| 2010/0313489 | A1 | * | 12/2010 | Teramoto et al. ............... 51/309 |
| 2012/0208006 | A1 | | 8/2012 | Okamura et al. |
| 2012/0304544 | A1 | | 12/2012 | Yokoshi |
| 2012/0329632 | A1 | | 12/2012 | Malik et al. |

FOREIGN PATENT DOCUMENTS

| | | |
|---|---|---|
| CN | 1190424 A | 8/1998 |
| CN | 1242350 A | 1/2000 |
| CN | 1485299 A | 3/2004 |
| CN | 1526683 A | 9/2004 |
| CN | 1978383 A | 6/2007 |
| CN | 101084170 A | 12/2007 |
| CN | 101102863 A | 1/2008 |
| CN | 101293773 A | 10/2008 |
| CN | 101583451 A | 11/2009 |
| EP | 2500332 A1 | 9/2012 |
| EP | 2612719 A1 | 7/2013 |
| JP | 58-58247 A | 4/1983 |

(Continued)

OTHER PUBLICATIONS

Angseryd et al., "Detailed microstructure of a cBN based cutting tool material," International Journal of Refractory Metals and Hard Materials, vol. 27, Issue 2, p. 249-255 (2009).

(Continued)

Primary Examiner — David Sample
Assistant Examiner — Seth Dumbris
(74) Attorney, Agent, or Firm — Venable LLP; Michael A. Sartori; Tamatane J. Aga

(57) ABSTRACT

A cubic boron nitride sintered body tool has, at least at a cutting edge, a cubic boron nitride sintered body composed of a cubic boron nitride particle and a binder phase. The binder phase contains at least $Al_2O_3$ and a Zr compound. On any straight line in the sintered body, the mean value of a continuous distance occupied by $Al_2O_3$ is 0.1-1.0 μm, and the standard deviation of the continuous distance occupied by $Al_2O_3$ is not more than 0.8. On the straight line, X/Y is 0.1-1 where X represents the number of points of contact between $Al_2O_3$ and the Zr compound, and Y represents the sum of the number of points of contact between $Al_2O_3$ and cBN and the number of points of contact between $Al_2O_3$ and binder phase component(s) other than $Al_2O_3$ and the Zr compound.

3 Claims, No Drawings

(56) References Cited

FOREIGN PATENT DOCUMENTS

| | | | |
|---|---|---|---|
| JP | 02-92868 A | 4/1990 | |
| JP | 2-282443 A | 11/1990 | |
| JP | 03205364 A | 9/1991 | |
| JP | 04026554 A | 1/1992 | |
| JP | 05-051261 * | 3/1993 | .............. C04B 35/58 |
| JP | 2546709 B2 | 10/1996 | |
| JP | 2971203 B2 | 11/1999 | |
| JP | 2000-044347 A | 2/2000 | |
| JP | 2000-044350 A | 2/2000 | |
| JP | 2002-003276 A | 1/2002 | |
| JP | 2002-302732 A | 10/2002 | |
| JP | 2006-315898 A | 11/2006 | |
| JP | 2008-094670 A | 4/2008 | |
| JP | 2010-089223 A | 4/2010 | |
| KR | 10-0412181 B1 | 3/2004 | |
| KR | 2009-0116720 A | 11/2009 | |
| WO | WO-96/36677 A1 | 11/1996 | |
| WO | WO-2006/046128 A1 | 5/2006 | |
| WO | WO-2008/087940 A1 | 7/2008 | |
| WO | WO-2011/059020 A1 | 5/2011 | |

OTHER PUBLICATIONS

Office Action in Korean Patent Application No. 10-2012-7011397, dated Dec. 30, 2013.
Office Action in Chinese Patent Application No. 201180004615.6, dated Nov. 4, 2013.
Extended European Search Report issued in European Patent Application No. 11836317.5 dated May 16, 2014.
International Search Report and Written Opinion issued in PCT Application No. PCT/JP2011/074628 dated Dec. 27, 2011.
Notice of Allowance issued in U.S. Appl. No. 13/700,041 dated Oct. 8, 2014.
Office Action issued in U.S. Appl. No. 13/700,041 dated Jun. 26, 2014.
Office Action issued in U.S. Appl. No. 13/700,041 dated Mar. 13, 2014.
International Search Report issued in PCT Application No. PCT/JP2011/066814 dated Sep. 20, 2011.
Notification of the First Office Action in Chinese Patent Application No. 201180017127.9, dated Sep. 28, 2014.

* cited by examiner

CUBIC BORON NITRIDE SINTERED BODY TOOL

TECHNICAL FIELD

The present invention relates to a sintered body of cubic boron nitride (hereinafter also referred to as cBN) containing cBN as a main component.

BACKGROUND ART

Hitherto, high-hardness sintered bodies using cubic boron nitride have been known. A cBN particle is higher in hardness, strength and toughness than ceramic binders, serves as a skeleton in the sintered body, and serves to hold such material strength as to enable enduring the cutting of high-hardness hardened steel. In contrast, ceramic binders serve to enable a cBN particle, which is a difficult-to-sinter material, to be sintered at industrial-level pressure and temperature, and simultaneously impart the effect of suppressing chemical/thermal wear because the ceramic binders have lower reactivity with iron than that of cBN.

The cBN sintered bodies are roughly divided into two categories: one that has a high cBN content and in which cBN particles are bonded to each other and the remainder is made of a binder containing Co and/or Al as a main component (hereinafter abbreviated as high cBN content sintered body); and the other that has a relatively low cBN content and in which cBN particles have a low ratio of contact with each other and are bonded together interposing ceramics having a low affinity with steel and made of Ti nitride (TiN) or Ti carbide (TiC) therebetween (hereinafter abbreviated as low cBN content sintered body).

The former, the high cBN content sintered body achieves outstanding stability and long life due to cBN's excellent mechanical characteristics (high hardness, high strength, high toughness) and high thermal conductivity in applications where chips are broken down and unlikely to generate shear heat, and is suitable for the high-efficiency cutting of an iron-based sintered part governed by mechanical wear and damage due to abrasion against a hard particle as well as of gray cast iron governed by damage due to thermal shock in high-speed continuous cutting. However, the high cBN content sintered body has shorter life in processing hardened steel and the like where a continuous chip generates a mass of shear heat that exposes a cutting edge to high temperatures, because cBN components thermally worn by iron cause more rapid development of wear than that in conventional cemented carbide tools and ceramic tools.

In contrast, the latter, the low cBN content sintered body demonstrates excellent wear resistance because of the effect of the binder that has a lower affinity with steel under high temperatures than that of cBN and made of TiN or TiC ceramics, and has opened up the market of hardened steel cutting as a cutting tool that can achieve ten times to several tens of times longer tool life than that of conventional tools particularly in processing hardened steel that could not be practically processed with conventional cemented carbide tools and ceramic tools.

A variety of these cBN sintered bodies have been developed.

For instance, Japanese Patent Laying-Open No. 2000-044347 (PTL 1) and Japanese Patent Laying-Open No. 2000-044350 (PTL 2) describe a cBN sintered body consisting of 45 to 70 volume % cBN particles and a binder phase containing at least one selected from the group consisting of: carbides, nitrides, carbonitrides, and borides of group 4a, 5a and 6a elements; nitrides, borides, oxides, carbonitrides, and borides of Al; and a mutual solid solution thereof, where the mean value and the standard deviation of the thickness of the binder phase are defined.

In addition, Japanese Patent Laying-Open No. 2002-302732 (PTL 3) describes a cBN sintered body consisting of an ultrafine-grained cBN particle having a particle size of not less than 0.01 μm and not more than 0.70 μm and a binder phase consisting of at least one of: group 4a, 5a and 6a elements; Al; carbides, nitrides, and borides thereof; and a mutual solid solution and a mixture thereof, wherein the mean value of the thickness of the binder phase is defined.

As mentioned above, in the high-efficiency cutting of cast iron, the high cBN content sintered body has been in practical use. In recent years, the enhancement in the performance of automobile engines is accompanied by the progress of the adoption of aluminum in cylinder blocks aimed at reducing weight. For a liner that is a portion of a cylinder block where a piston slides, cast iron that has excellent strength and wear resistance is employed, and centrifugally cast iron that excels sand mold cast iron in mass productivity has been increasingly employed in recent years. Centrifugal casting is a technique of rotating a casting mold in casting a liner such that centrifugal force is utilized to make a hollow casting without the use of a core.

The centrifugal casting above, which, in principle, rapidly cools a contact portion and an innermost diameter portion of the casting mold and thus causes a dendrite structure or a rosette structure having very poor machinability to be created in these areas, has a problem that tool life is significantly deteriorated when the cast iron structure of a portion to be cut is the above-described dendrite structure or rosette structure in finishing an internal diameter as desired through cutting. It also has a problem of unstable tool life because a cast iron structure greatly varies depending on the production lot of a liner. As such, the recent fact is that conventional high cBN content sintered bodies have insufficient wear resistance and cannot provide satisfactory tool life.

In view of such a situation, WO 2008/087940 (PTL 4) employs $Al_2O_3$ as a main component of a binder phase and adds appropriate quantities of $ZrO_2$ and TiC to stabilize tool life in the centrifugally cast iron processing; however, satisfactory tool life has not been obtained.

CITATION LIST

Patent Literature

PTL 1: Japanese Patent Laying-Open No. 2000-044347
PTL 2: Japanese Patent Laying-Open No. 2000-044350
PTL 3: Japanese Patent Laying-Open No. 2002-302732
PTL 4: WO 2008/087940

SUMMARY OF INVENTION

Technical Problem

In view of the problems above, an object of the present invention is to provide a cBN sintered body tool having high cutting performance and excellent tool life in the cutting of cast iron that is produced through centrifugal casting and has a mixture of the above-described dendrite structure and rosette structure having poor machinability.

Solution to Problem

As a result of a detailed observation of the form of wear of a cBN sintered body tool in cutting cast iron that has a dendrite structure or a rosette structure, it has been found out that in a binder phase composed of a Ti compound or an Al compound, a crack appears at the interface or grain boundary of $Al_2O_3$ particles having excellent heat resistance and that the propagation of the crack causes wear to develop, which in some cases leads to a fracture.

In the conventional art, a cBN sintered body composed of $Al_2O_3$, cBN, $ZrO_2$, and TiC is so thick in average thickness of $Al_2O_3$ that it has poor fracture resistance. In addition, although a technology defining appropriate values of the thickness and the standard deviation of a binder phase is publicly known, the contained amount of $Al_2O_3$ is small and the wear resistance is insufficient in processing centrifugally cast iron.

Hence, in order to ascertain the optimal arrangement of the interface or grain boundary of $Al_2O_3$ particles that serves as a starting point of a crack as well as the optimal arrangement of a Zr compound that promises the effect of reinforcing $Al_2O_3$, the inventors fabricated cBN sintered bodies varying in particle size, content, and a mixing method of each component, and examined a correlation with cutting performance. As a result, it has been achieved successfully to optimally arrange a Zr compound and a cBN particle in $Al_2O_3$ so as to interrupt $Al_2O_3$, which is excellent in heat resistance but poor in toughness, and to set the average thickness and standard deviation of $Al_2O_3$ within the optimal range, thereby to achieve a high-level balance between heat resistance and toughness.

Specifically, the present invention has the following configuration.

(1) A cubic boron nitride sintered body tool, having, at least at a cutting edge, a cubic boron nitride sintered body composed of a cubic boron nitride particle and a binder phase, characterized in that cBN content is not less than 20 volume % and not more than 60 volume %, the binder phase contains at least $Al_2O_3$ and a Zr compound, on any straight line in the sintered body, a mean value of a continuous distance occupied by $Al_2O_3$ is not less than 0.1 μm and not more than 1.0 μm, and a standard deviation of the continuous distance occupied by $Al_2O_3$ is not more than 0.8, on the straight line, X/Y is not less than 0.1 and not more than 1 where X represents the number of points of contact between $Al_2O_3$ and the Zr compound, and Y represents the sum of the number of points of contact between $Al_2O_3$ and cBN and the number of points of contact between $Al_2O_3$ and binder phase component(s) other than $Al_2O_3$ and the Zr compound, and the Zr compound has an average particle size of not less than 0.01 μm and not more than 0.1 μm.

(2) The cubic boron nitride sintered body tool according to item (1) above, characterized in that as the Zr compound contained in the sintered body above, not less than 0.5 volume % and not more than 5 volume % ZrC and $ZrO_2$ in total is contained.

(3) The cubic boron nitride sintered body tool according to item (1) or (2) above, characterized in that on any straight line in the sintered body above, X/Y is not less than 0.5 and not more than 0.9.

Advantageous Effects of Invention

The present invention can provide a cBN sintered body tool having high cutting performance and excellent tool life. That is, it has been achieved successfully to optimally arrange a Zr compound and a cBN particle in $Al_2O_3$ so as to interrupt $Al_2O_3$, which is excellent in heat resistance but poor in toughness, and to set the average thickness and standard deviation of $Al_2O_3$ within the optimal range, thereby to achieve a high-level balance between heat resistance and toughness.

In addition, since the bonding force between $Al_2O_3$ and a cBN particle is weak, by bonding a cBN particle and an $Al_2O_3$ particle with a high reactivity compound that is excellent in bonding force and other than $Al_2O_3$ (for example, TiAl, Ti, Al, TiZr, Zr, or the like) interposed therebetween, and dispersing a Zr compound in $Al_2O_3$, higher wear resistance and fracture resistance can be achieved. In particular, it is preferable to coat a cBN particle in advance with Zr or TiZr.

DESCRIPTION OF EMBODIMENTS

A cBN sintered body tool according to the present invention is a cBN sintered body tool having, at least at a cutting edge, a cBN sintered body composed of a cBN particle and a binder phase, characterized in that cBN content is not less than 20 volume % and not more than 60 volume %, that the binder phase contains $Al_2O_3$ and a Zr compound, that on any straight line in the sintered body, a mean value and a standard deviation of a distance occupied by $Al_2O_3$ are not less than 0.1 μm and not more than 1.0 μm and not more than 0.8, respectively, that on the straight line, X/Y is not less than 0.1 and not more than 1 where X represents the number of points of contact between $Al_2O_3$ and the Zr compound, and Y represents the sum of the number of points of contact between $Al_2O_3$ and cBN and the number of points of contact between $Al_2O_3$ and binder phase component(s) other than $Al_2O_3$ and the Zr compound, and that the Zr compound has an average particle size of not less than 0.01 μm and not more than 0.1 μm.

The cBN sintered body tool above may be a cBN sintered body tool that has the cBN sintered body at least at a portion of a base material made of cemented carbide to serve as a cutting edge, or may be a cBN sintered body tool that is composed only of the cBN sintered body. In addition, the cBN sintered body to serve as a cutting edge may have a hard ceramic coating layer on a surface thereof.

A detailed description of a cBN sintered body portion will be given below.

The cBN sintered body above is characterized by having a cBN content of not less than 20 volume % and not more than 60 volume %. The cBN content of less than 20 volume % causes reduction in fracture resistance of the sintered body, while the cBN content of more than 60 volume % causes a reduction in wear resistance. More preferably, the cBN content is not less than 40 volume % and not more than 50 volume %. The cBN sintered body above is also characterized in that the binder phase contains at least $Al_2O_3$ and a Zr compound. This can enhance wear resistance and fracture resistance.

The cBN sintered body above is characterized in that on any straight line in the sintered body, a mean value of a continuous distance occupied by $Al_2O_3$ is not less than 0.1 μm and not more than 1.0 μm. The mean value of less than 0.1 μm causes a reduction in heat resistance, while the mean value of more than 1.0 μm causes a reduction in fracture resistance. More preferably, the mean value is not less than 0.3 μm and not more than 0.6 μm. The cBN sintered body above is also characterized in that on the any straight line, a standard deviation of the continuous distance occupied by $Al_2O_3$ is not more than 0.8. The standard deviation of more than 0.8 causes fracture resistance to vary widely. More preferably, the standard deviation is not less than 0.2 and not more than 0.6.

The cBN sintered body above is further characterized in that on the straight line above, X/Y is not less than 0.1 and not more than 1 where X represents the number of points of contact between $Al_2O_3$ and the Zr compound, and Y represents the sum of the number of points of contact between $Al_2O_3$ and cBN and the number of points of contact between $Al_2O_3$ and binder phase component(s) other than $Al_2O_3$ and the Zr compound. When the X/Y is less than 0.1, an enhancing effect of the Zr compound on the toughness of $Al_2O_3$ is not provided, while the X/Y of more than 1 causes a reduction in an enhancing effect of $Al_2O_3$ on heat resistance.

The cBN sintered body above is characterized in that the Zr compound therein has an average particle size of not less than 0.01 μm and not more than 0.1 μm. When the average particle size of the Zr compound is less than 0.01 μm, the enhancing effect of the Zr compound on the toughness, of $Al_2O_3$ is not provided, while the average particle size of more than 0.1 μm causes the Zr compound itself to be prone to crush and causes a reduction in fracture resistance of the sintered body. More preferably, the Zr compound has an average particle size of not less than 0.03 μm and not more than 0.06 μm.

With the above-described configuration, the present invention has made it possible in a cBN sintered body to optimally arrange a Zr compound and a cBN particle in $Al_2O_3$ so as to interrupt $Al_2O_3$, which is excellent in heat resistance but poor in toughness, and to further set the average thickness and standard deviation of $Al_2O_3$ within the optimal range, thereby to achieve a high-level balance between heat resistance and toughness of the sintered body.

In addition, by containing not less than 0.5 volume % and not more than 5 volume % ZrC and $ZrO_2$ in total as the Zr compound contained in the sintered body above, fracture resistance and wear resistance can be further improved. That is, as the Zr compound contained in the sintered body above, the cBN sintered body tool according to the present invention contains preferably not less than 0.5 volume % and not more than 5 volume % ZrC and $ZrO_2$ in total, and more preferably not less than 1.5 volume % and not more than 4.5 volume % ZrC and $ZrO_2$ in total.

ZrC and $ZrO_2$ are particularly highly effective in improving the toughness of $Al_2O_3$. When these two compounds are less than 0.5 volume % in total of the sintered body, the effect of improving the toughness is not provided, while these compounds of more than 5 volume % in total cause a relative reduction in the contained amount of $Al_2O_3$ and a reduction in heat resistance.

Further, X/Y of not less than 0.5 and not more than 0.9 on any straight line in the sintered body above provides increased reliability against fracture. That is, preferably, the cBN sintered body tool according to the present invention has X/Y of not less than 0.5 and not more than 0.9 on any straight line in the sintered body above.

EXAMPLES

[Fabrication of cBN Sintered Body Tool]
(Fabrication of cBN Sintered Body)

Special binders in which ultrafine-grained Zr compound(s) are uniformly dispersed in $Al_2O_3$ were fabricated through advance mixing and pulverization of Zr compounds having average particle sizes of not more than 50 nm (except some examples and comparative examples) and as shown in Table 1, Ti compounds having average particle sizes of not more than 300 nm, and $Al_2O_3$ having an average particle size of not more than 200 nm with a ball media made of $ZrO_2$ and having a diameter of 0.2 mm in an ethanol solvent at a flow rate of 0.2-0.5 L/min for 30-120 minutes and through subsequent removal of the media. The control over the value of X/Y can be achieved by experimentally changing conditions of pulverization and mixing within the above-described range or by changing the contained amount of the Zr compounds.

As to Examples 1-11, cBN particles and the binder above were uniformly mixed with a ball media made of $ZrO_2$ and having a diameter of 3 mm by a ball mill mixing method to provide mixed powder, which was deposited on a support plate made of cemented carbide and filled into a capsule made of Mo, and subsequently sintered in an ultrahigh pressure apparatus under a pressure of 7.0 GPa at a temperature of 1600 degrees for 30 minutes.

As to Examples 12 and 13, an RF sputtering PVD apparatus was used to coat a cBN particle in advance with TiZr and Zr, respectively, with an average coating thickness of 30 nm, and filling and sintering were performed in the same manner as described above.

The composition of the cBN sintered body in each example and comparative example is shown in Table 1.
(Fabrication of Tool)

The obtained sintered bodies were cut into a predetermined shape, joined to a tool substrate made of cemented carbide by means of a commercially available brazing material, and subjected to grinding into a predetermined tool shape.
[Evaluation]
(Measurement of cBN Sintered Body Characteristics)

As to the cBN sintered body obtained as above in each example and comparative example, the mean value and the standard deviation of the distance continuously occupied by $Al_2O_3$ on any straight line in the sintered body was measured employing a method that will be described next.

First, the cBN sintered body was subjected to mirror polishing, and a reflection electron image of a structure of the CBN sintered body in any area was photographed with an electron microscope at a magnification of 10000 times. The contrast between light and dark corresponding to the composition was observed, and an EDX (Energy-Dispersive X-ray spectroscopy) attachment was used to estimate compounds from an overlapping state of various kinds of elements. As a result, it was confirmed that a black area was a cBN particle and that a gray area and a white area were a binder phase. Further, it was identified that the gray, dark area was $Al_2O_3$ and that the white, light shaded area was Zr compounds (oxides, carbides, nitrides, borides, boronnitrides).

Next, any straight line was drawn on the photograph, and a value of X/Y on the straight line was obtained where X represents the number of points at which $Al_2O_3$ and the Zr compound contact with each other, and Y represents the sum of the number of points at which $Al_2O_3$ and cBN contact with each other and the number of points at which $Al_2O_3$ and binder phase component(s) other than $Al_2O_3$ and the Zr compound contact with each other.

Here, in consideration of the uniformity of the structure, the number of straight lines was determined such that the total number of points of contact on the straight line was not less than 50. In addition, on the straight lines in that number of straight lines, a distance (length) continuously occupied by the above-described $Al_2O_3$ was measured, and the mean value and the standard deviation thereof were obtained. As to cBN content, based on the above-described photograph of the sintered body structure, a cBN particle area and a binder phase area were binarized through image processing, and the area occupied by cBN particles was employed as volume content. The binder phase composition was identified based on XRD (X-Ray Diffraction).

With respect to contents of the Zr compound and the Ti compound, based on the contrast between light and dark in the above-described photograph of the sintered body structure, their respective area of occupation was calculated through image processing and employed as volume content. With respect to the average particle size of the Zr compound, the average particle size of raw material powder charged is shown, and it is confirmed based on the above-described photograph of the sintered body structure that the particle size of the raw material powder was generally maintained. The results are shown in Table 1.

(Cutting Test)

Each tool fabricated as above was subjected to cutting test under the following conditions.
Work Material: FC250 (the internal machining of a centrifugally cast iron sleeve, hardness: HB230)
Shape of tool: CNGA120408
Cutting Conditions:

| Cutting speed | Vc = 700 m/min. |
| Feed rate | f = 0.3 mm/rev. |
| Depth of cut | ap = 0.05 mm |
| With a cutting fluid | |

Tool life: A point of time when an amount of flank wear or chipping reached 0.2 mm was judged as the end of tool life. The results are shown in Table 2.

TABLE 1

| | cBN content (vol %) | Distance occupied by $Al_2O_3$ on any straight line in sintered body | | Ratio of contact points between various binder components X/Y | Binder phase | | | |
| | | Mean value (μm) | Standard deviation | | Composition | Average particle size of Zr compound (μm) | Zr compound content in sintered body (vol %) | Ti compound content in sintered body (vol %) |
| --- | --- | --- | --- | --- | --- | --- | --- | --- |
| Example 1 | 45 | 0.70 | 0.60 | 0.60 | $ZrO_2$, TiC | 0.04 | 4.5 | 1.5 |
| Example 2 | 45 | 0.10 | 0.20 | 0.10 | $ZrO_2$, TiC | 0.04 | 4.5 | 1.5 |
| Example 3 | 45 | 1.00 | 0.80 | 1.00 | $ZrO_2$, TiC | 0.04 | 4.5 | 1.5 |
| Example 4 | 45 | 0.50 | 0.60 | 0.95 | $ZrO_2$, TiN | 0.01 | 4.5 | 1.5 |
| Example 5 | 45 | 0.95 | 0.70 | 0.15 | $ZrO_2$, TiN | 0.10 | 4.5 | 1.5 |
| Example 6 | 20 | 0.90 | 0.75 | 0.90 | $ZrO_2$, TiC | 0.03 | 10.2 | 7.8 |
| Example 7 | 60 | 0.40 | 0.35 | 0.30 | $ZrO_2$, TiC | 0.03 | 3.0 | 0.8 |
| Example 8 | 45 | 0.70 | 0.60 | 0.48 | $ZrO_2$, ZrN, $ZrB_2$ | 0.04 | 4.5 | 0.0 |
| Example 9 | 45 | 0.70 | 0.60 | 0.60 | $ZrO_2$, $Zr_5B_3N_2$ | 0.04 | 3.0 | 0.0 |
| Example 10 | 45 | 0.35 | 0.27 | 0.70 | $ZrO_2$, ZrC | 0.05 | 2.7 | 0.0 |
| Example 11 | 45 | 0.45 | 0.38 | 0.40 | $ZrO_2$, ZrC | 0.05 | 1.9 | 0.0 |
| Example 12 | 45 | 0.37 | 0.30 | 0.85 | $ZrO_2$, ZrC, TiN, ZrN, $TiB_2$ | 0.04 | 4.2 | 1.2 |
| Example 13 | 45 | 0.34 | 0.35 | 0.82 | $ZrO_2$, ZrC, $ZrB_2$, ZrN | 0.04 | 4.1 | 0.0 |
| Comparative Example 1 | 15 | 1.30 | 1.20 | 1.50 | $ZrO_2$ | 0.20 | 12.5 | 0.0 |
| Comparative Example 2 | 65 | 0.50 | 0.40 | 0.50 | $ZrO_2$ | 0.04 | 2.8 | 0.0 |
| Comparative Example 3 | 45 | 1.20 | 0.80 | 0.15 | $ZrO_2$, TiC | 0.20 | 4.5 | 1.5 |
| Comparative Example 4 | 45 | 0.90 | 1.00 | 0.20 | $ZrO_2$, ZrC | 0.20 | 4.5 | 0.0 |

TABLE 2

| | Cutting length before reaching the end of tool life (km) | Form of damage |
| --- | --- | --- |
| Example 1 | 6.5 | Normal wear |
| Example 2 | 5.5 | Normal wear |
| Example 3 | 5.7 | Microchipping |
| Example 4 | 6.0 | Microchipping |
| Example 5 | 5.6 | Microchipping |
| Example 6 | 5.2 | Microchipping |
| Example 7 | 5.1 | Normal wear |
| Example 8 | 6.7 | Normal wear |
| Example 9 | 4.8 | Microchipping |
| Example 10 | 8.5 | Normal wear |
| Example 11 | 7.8 | Normal wear |
| Example 12 | 8.8 | Normal wear |
| Example 13 | 9.2 | Normal wear |
| Comparative Example 1 | 1.6 | Fracture |
| Comparative Example 2 | 2.8 | Normal wear |
| Comparative Example 3 | 2.1 | Fracture |
| Comparative Example 4 | 2.3 | Fracture |

As is evident from Table 2, the tools of the examples exhibited cutting performance superior to the tools of the comparative examples.

Though embodiments and examples according to the present invention have been described as above, it should be understood that the embodiments and the examples disclosed herein are illustrative and non-restrictive in every respect. The scope of the present invention is defined not only by the above description but also by the terms of the claims, and is intended to include any modifications within the scope and meaning equivalent to the terms of the claims.

The invention claimed is:

1. A cubic boron nitride sintered body tool, comprising, at least at a cutting edge, a cubic boron nitride sintered body comprising a cubic boron nitride particle and a binder phase, said cubic boron nitride sintered body having a cubic boron nitride content of not less than 20 volume % and not more than 60 volume %, said binder phase containing at least $Al_2O_3$ and a Zr compound, on any straight line in said cubic boron nitride sintered body, a mean value of a continuous distance occupied by $Al_2O_3$ being not less than 0.1 μm and not more than 1.0 μm, and a standard deviation of the continuous distance occupied by $Al_2O_3$ being not more than 0.8, on the straight line, X/Y being not less than 0.1 and not more than 1 where X represents the number of points of contact between $Al_2O_3$ and the Zr compound, and Y represents the sum of the number of points of contact between $Al_2O_3$ and cubic boron nitride and the number of points of contact between $Al_2O_3$ and binder phase component other than $Al_2O_3$ and the Zr compound, and the Zr compound having an average particle size of not less than 0.01 μm and not more than 0.1 μm.

2. The cubic boron nitride sintered body tool according to claim 1, wherein as the Zr compound contained in said cubic boron nitride sintered body, not less than 0.5 volume % and not more than 5 volume % ZrC and $ZrO_2$ in total are contained.

3. The cubic boron nitride sintered body tool according to claim 1, wherein on any straight line in said cubic boron nitride sintered body, X/Y is not less than 0.5 and not more than 0.9.

* * * * *